US006834696B1

(12) United States Patent
Yurjevich et al.

(10) Patent No.: US 6,834,696 B1
(45) Date of Patent: Dec. 28, 2004

(54) RUNFLAT TIRE WITH CANTILEVER-LIKE SIDEWALL CONSTRUCTION

(75) Inventors: Martin A. Yurjevich, North Canton, OH (US); Charles D. Spragg, Hudson, OH (US); Stephen M. Vossberg, Medina, OH (US); James M. Kirby, Akron, OH (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/607,070

(22) Filed: Jun. 29, 2000

(51) Int. Cl.$^7$ .......................... B60C 17/00; B60C 17/08; B60C 9/00; B60C 3/00
(52) U.S. Cl. .................. 152/517; 152/454; 152/516; 152/539; 152/555
(58) Field of Search ................. 152/516–518, 152/454, 522, 539

(56) References Cited

U.S. PATENT DOCUMENTS

| 2,037,640 | A |   | 4/1936  | Macmillan ............... 152/13  |
| 3,392,772 | A |   | 7/1968  | Powers ................... 152/158 |
| 3,486,547 | A |   | 12/1969 | Powers ................... 152/352 |
| 3,610,308 | A |   | 10/1971 | MacDonald ............... 152/158 |
| 3,631,913 | A | * | 1/1972  | Boileau ................... 152/454 |
| 3,949,798 | A | * | 4/1976  | Gardner et al. .......... 152/454 |
| 3,954,131 | A |   | 5/1976  | Hoshino et al. .......... 152/354 |
| 4,193,437 | A | * | 3/1980  | Powell .................... 152/517 |
| 4,203,481 | A | * | 5/1980  | Ranik, Jr. ................ 152/517 |
| 4,287,924 | A |   | 9/1981  | Deck et al. ............... 152/153 |
| 4,365,659 | A |   | 12/1982 | Yoshida et al. ........... 152/354 |
| 5,016,697 | A | * | 5/1991  | Noma et al. .............. 152/454 |
| 5,238,040 | A |   | 8/1993  | Ghilardi .................. 152/517 |
| 5,309,970 | A |   | 5/1994  | Kawabata et al. ......... 152/517 |
| 5,368,082 | A |   | 11/1994 | Oare et al. ............... 152/517 |
| 5,413,160 | A |   | 5/1995  | Giuliano .................. 152/458 |
| 5,511,599 | A | * | 4/1996  | Willard, Jr. .............. 152/454 |
| 5,769,980 | A | * | 6/1998  | Spragg et al. ............ 152/517 |
| 5,795,416 | A |   | 8/1998  | Willard, Jr. et al. ....... 152/517 |
| 5,868,190 | A | * | 2/1999  | Willard et al. ............ 152/517 |
| 5,871,602 | A | * | 2/1999  | Paonessa et al. .......... 152/517 |
| 5,879,484 | A |   | 3/1999  | Spragg et al. ............ 152/516 |
| 6,039,099 | A |   | 3/2000  | Muhlhoff .................. 152/158 |
| 6,044,884 | A |   | 4/2000  | Peda ....................... 152/454 |
| 6,138,732 | A | * | 10/2000 | Kobayashi et al. ........ 152/539 |
| 6,209,604 | B1| * | 4/2001  | Nishikawa et al. ........ 152/458 |

FOREIGN PATENT DOCUMENTS

| EP | 0881105      | * | 12/1998 |
| EP | 0 985 554 A1 |   | 3/2000  |
| EP | 0 985 557 A2 |   | 3/2000  |
| EP | 0 985 558 A2 |   | 3/2000  |
| EP | 0 988 999 A2 |   | 3/2000  |
| FR | 2 778 367 A1 |   | 11/1999 |
| GB | 418 293      |   | 10/1934 |
| JP | 63141809     | * | 6/1988  |
| WO | WO 98/54012  |   | 12/1998 |
| WO | WO 98/54013  |   | 12/1998 |
| WO | WO 98/54014  |   | 12/1998 |

* cited by examiner

Primary Examiner—Jeff H. Aftergut
Assistant Examiner—Justin Fischer
(74) Attorney, Agent, or Firm—Fred H. Zollinger, III; Michael R. Huber

(57) ABSTRACT

A runflat tire is provided that may be used in applications currently requiring a large aspect ratio tire. The runflat tire of the invention may be substituted in these applications while providing desirable ride characteristics. The runflat tire includes a sidewall with a radial portion and a cantilever portion. The cantilever portion may be fabricated by extending a sidewall insert in the axially inward direction or by extending the bead filler in the axially outward direction. In other embodiments, the cantilever sidewall portion is formed by a combination of the sidewall insert and the bead filler. The resulting runflat tire has desired durability in the uninflated operating condition while having desired ride characteristics in the inflated condition. The sidewall structure allows the tire to be used in applications presently requiring a tire with a high aspect ratio.

36 Claims, 12 Drawing Sheets

RUNFLAT TIRE WITH CANTILEVER-LIKE SIDEWALL CONSTRUCTION

BACKGROUND OF THE INVENTION

1. Technical Field

The present invention generally relates to pneumatic tire construction and, more particularly, to the structure of a runflat tire. Specifically, the present invention relates to a cantilever runflat tire having a sidewall insert and a stiffener member that work together to provide desirable ride and handling characteristics to the tire.

2. Background Information

A runflat tire is known in the art as a pneumatic tire that safely operates in a deflated (zero PSI) condition. Typical runflat tires include a pair of radial crescent shaped reinforcing sidewall elements fabricated from at least one solid band of high modulus low hysteresis material built into the sidewall of a conventional tire. Runflat tires are becoming more desired in today's vehicles because a vehicle using four runflat tires does not have to carry a spare tire. Spare tires are undesirable because they add weight to the vehicle and consume valuable storage space in a vehicle. Runflat tires are also desirable because they make vehicles safer by preventing a driver from having to change a tire in an unsafe location.

Storing spare tires has become increasingly problematic in today's sport utility vehicles because the vehicles are using larger tires with larger tire rims. One solution to the size problem has been to provide a high inflation pressure mini spare tire that may be used by the vehicle owner as a temporary solution until the vehicle may be driven to a service station. As consumer's tastes have changed toward larger vehicles with larger rims, the mini spare tire has grown to such a large size that the purpose of providing the mini spare has been defeated. The art thus desires runflat tires that may be used on sport utility vehicles and trucks. These runflat tires must provide acceptable inflated ride characteristics while being used in situations where a high aspect ratio tire is called for. The art particularly desires runflat tires for situations where conventional tires having aspect ratios of 65 and higher are required.

The design of prior art runflat tires has been limited based on durability requirements and ride characteristics. The art recognizes that uninflated durability varies inversely as aspect ratio increases in prior art runflat tires. For example, a typical prior art tire having an aspect ratio of 45 may run hundreds of uninflated kilometers while a typical prior art tire having an aspect ratio of 60 may only operate for 80 uninflated kilometers. The unofficial industry standard for runflat tires is at least 50 miles at 55 miles per hour (80 kilometers at 88 kilometers per hour). A successful runflat tire to be used in high aspect ratio applications must meet or exceed this standard while providing acceptable ride characteristics.

The art generally recognizes that a lower aspect ratio tire has better handling characteristics than a higher aspect ratio tire while having decreased ride characteristics. Similarly, runflat tires having crescent-shaped sidewall inserts generally have improved handling characteristics while having decreased ride characteristics.

Prior art cantilever tires such as the tire disclosed in U.S. Pat. No. 3,486,547 provide a better combination of ride and handling characteristics. For instance, a cantilever tire can provide increased handling characteristics at a similar ride quality as a conventional tire. The art generally recognizes that cantilever tires include a pair of cantilevered sidewall portions that extend generally parallel to the ground adjacent the tire rim compared to a conventional tire. The cantilevered portion acts as a stabilizer ring that allows flexibility in the radial direction and provides stiffness in other directions. The cantilevered portion of the sidewall adjacent the rim resists lateral distortion during cornering. For lateral loads, a cantilever tire responds as if it had an effective rim width equal to the width of the rim plus the width of the cantilevered portions. The cantilever tire achieves the improved handling characteristic while not adversely affecting the ride characteristics of the tire.

SUMMARY OF THE INVENTION

In view of the foregoing, the present invention provides a runflat tire having the improved handling characteristics of a conventional tire while having the improved ride characteristics of a cantilever tire. The invention provides a cantilever runflat tire having a sidewall insert that provides the tire with sufficient radial stiffness in an uninflated condition to have acceptable uninflated durability. The cantilever runflat tire also includes a cantilever sidewall portion that provides desirable inflated ride characteristics. The cantilever runflat may be used in situations previously requiring a conventional high aspect ratio tire.

The cantilever runflat tire of the present invention includes a pair of axially-spaced bead portions with each having a bead filler and a bead core. The tire includes a pair of axially-spaced sidewalls with each of the sidewalls including an insert. Each of the sidewalls has a radial portion and a cantilever portion cantilevered with respect to the bead core.

The cantilever runflat tire has the advantage that the sidewall insert may be relatively thin and relatively lightweight compared to the amount of uninflated durability it provides to the tire. The thin sidewall insert also does not drastically increase the vertical spring rate of the runflat cantilever tire compared to a conventional cantilever tire. The cantilever runflat tire thus has desirable inflated ride characteristics while maintaining desirable uninflated durability.

The cantilever runflat tire of the invention also provides desirable ride and handling characteristics by including a stiffener member and sidewall insert fabricated from a hard, high modulus rubber compound having a Shore A Durometer between 70 and 97, a mechanical static modulus in the range of 1400 psi (9651 KPa) to 4000 psi (27576 KPa) at 15% strain, and loss tangent delta (tan δ) between 0.03 to 0.2 measured at 100° C., 7% deflection, and 10 Hz. The stiffener member may also include reinforcing members such as fabric or cords.

BRIEF DESCRIPTION OF THE DRAWINGS

The preferred embodiments of the invention, illustrative of the best mode in which applicant contemplated applying the principles of the invention, are set forth in the following description and are shown in the drawings and are particularly and distinctly pointed out and set forth in the appended Claims.

Similar numbers refer to similar parts throughout the specification.

DESCRIPTION OF THE PREFERRED EMBODIMENTS

Figure 1:
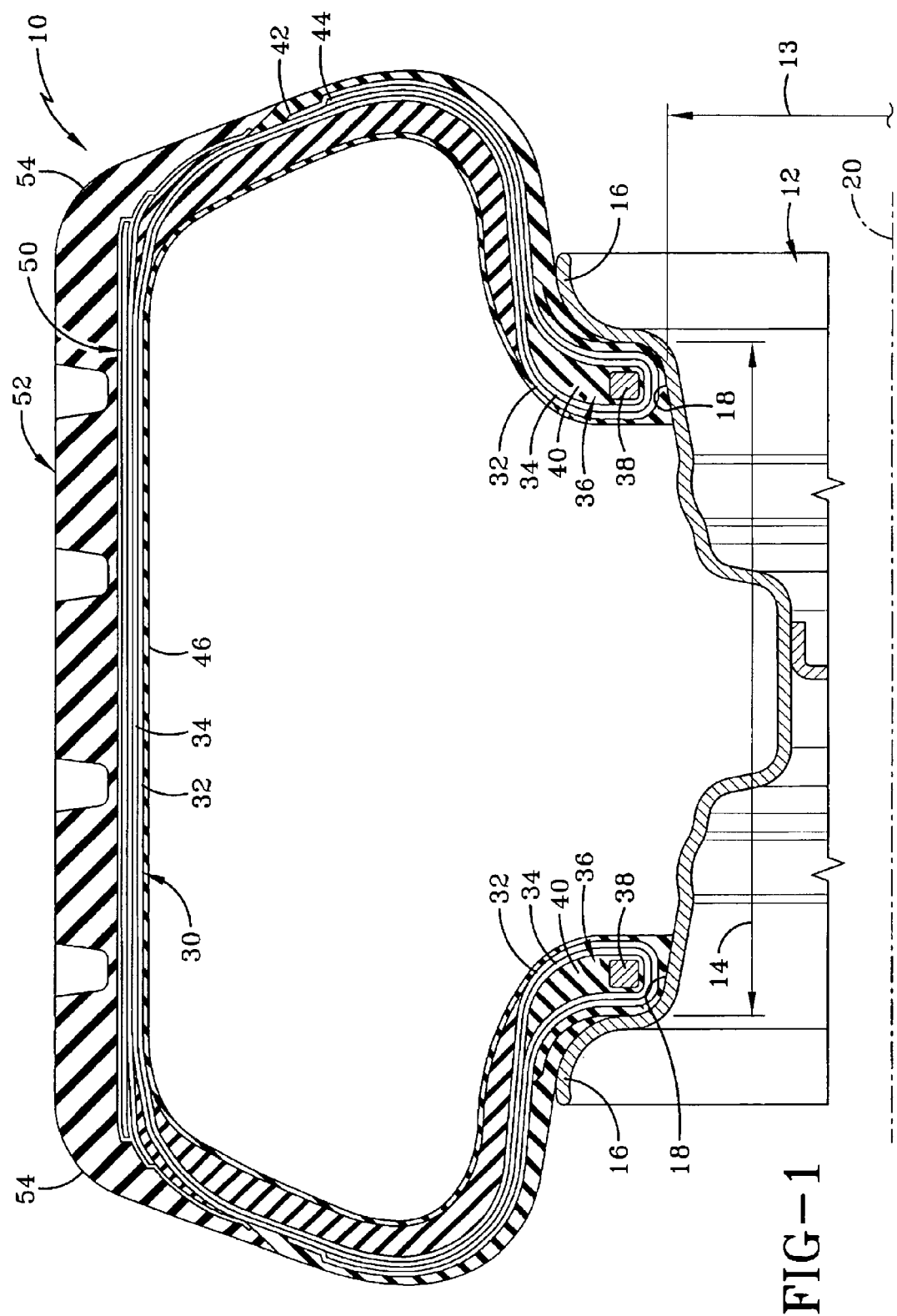
FIG. 1 is a sectional view of a first embodiment of the cantilever runflat tire of the present invention.
Figure 2:
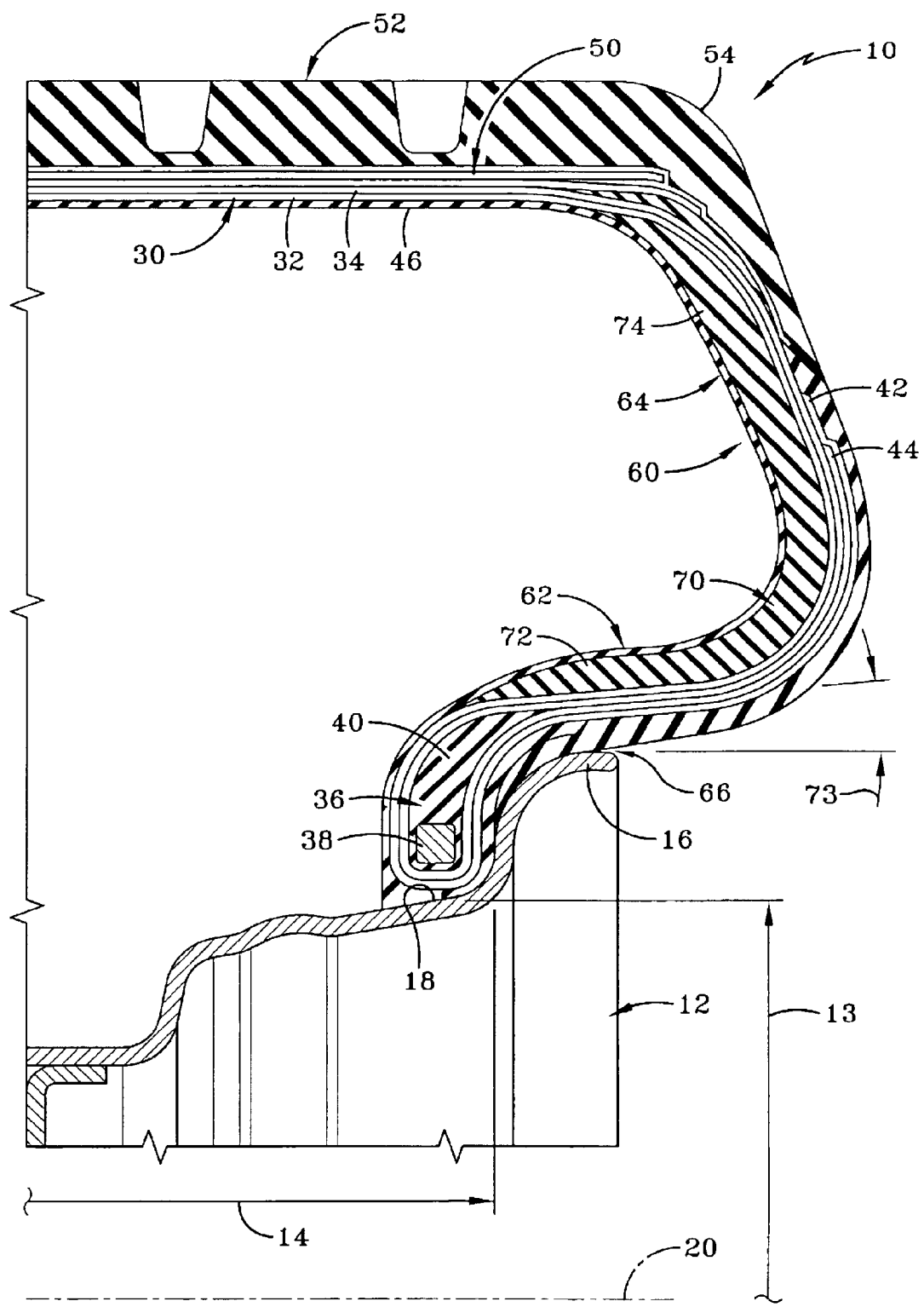
FIG. 2 is a sectional view of half of the tire of FIG. 1.

The first embodiment of the cantilever runflat tire of the present invention is indicated generally by the numeral 10 in FIGS. 1 and 2. Tire 10 is mounted on a rim 12 having a diameter and a width. The diameter of rim 12 is indicated by dimension line 13. The width of rim 12 is indicated by dimension line 14. Rim 12 includes a pair of flanges 16 which each extend radially outward and axially outward from a bead mounting surface 18. In the preferred embodiment, each flange 16 curves radially and axially outwardly. The outer end of each flange 16 is preferably substantially parallel to the rotational axis 20 of rim 12. In accordance with one of the objectives of the present invention, tire 10 allows the mounting rim diameter to be increased while decreasing the mounting rim width for vehicle applications that are normally fitted with high aspect ratio tires.

Tire 10 includes a tire carcass structure 30 that includes a first body cord or ply 32 and a second body cord or ply 34 extending generally between a pair of axially-spaced bead portions 36. Each bead portion 36 includes a bead core or bead ring 38 and a bead filler 40. First and second body plies 32 and 34 are turned up around each bead portion 36 in the axially and radially outward direction and end at first body ply end 42 and second body ply end 44. Tire 10 also includes an innerliner 46.

Tire 10 may also include a belt package 50 disposed radially outward of plies 32 and 34 and radially inward of a tread portion 52. The structure of belt package 50 may vary with different types of tires 10 as is known in the art. Tread portion 52 includes a pair of tread edges 54.

Tire 10 further includes a pair of axially spaced apart sidewalls 60. Each sidewall 60 extends from a bead portion 36 to a tread edge 54 of tread portion 52. Each sidewall 60 includes a cantilever portion 62 that is cantilevered with respect to bead core 38. Cantilever portion 62 is disposed +/−30 degrees with respect to axis of rotation 20. In the first embodiment, cantilever portion 62 extends substantially parallel to axis of rotation 20. Each sidewall 60 further includes a radial portion 64 that extends between cantilever portion 62 and tread edge 54. Each cantilever portion 62 extends from the sidewall-rim junction 66 to the radially inward end of radial portion 64.

Each sidewall 60 further includes a sidewall insert 70. Insert 70 is preferably crescent-shaped as depicted in the drawings but may be provided in a variety of other shapes as are known in the art. For instance, insert 70 may have a constant thickness, may be tapered evenly, or may be tapered unevenly along the length of its cross section. Insert 70 is positioned between plies 32, 34 and innerliner 46 in the first embodiment of the invention. The outer end of belt package 50 overlaps the radially outer end of insert 70 to provide durability. The overlap is preferably 1.25 cm to 2.54 cm.

Sidewall insert 70 includes a cantilevered portion 72 and a radial portion 74. Each cantilevered portion 72 is cantilevered axially inwardly from radially inner end of the radial portion 74. The cantilever angle 73 is preferably measured along a reference line that is tangent to body plies 32 or 34 in the cantilevered portion 72. A positive angle is measured in the radially outward direction as shown in FIG. 2 while a negative angle is measured in the radially inward direction.

Cantilevered portion 72 extends axially inward from the radially inner end of radial portion 74 to the radially and axially outward end of bead filler 40. The inner end of portion 72 is preferable tapered. In the embodiment of the invention depicted in FIG. 2, the radially and axially outer end of bead filler 40 overlaps the radially and axially inner end of portion 72.

In the preferred embodiment of tire 10, bead filler 40 and sidewall insert 70 are fabricated from the same material. The preferred material is a hard, high modulus rubber compound. For example, a hard, high modulus rubber compound having a Shore A Durometer between 70–97, a mechanical static modulus in the range of 1400 psi (9651 KPa) to 4000 psi (27576 KPa) (Young's Modulus) at 15% strain, and a loss tangent delta (tan δ) between 0.03 to 0.20 measured at 100° C., 7% deflection, and 10 Hz. Other similar materials may be used by those skilled in the art to fabricate tire 10. Insert 70 may also include reinforcing members such as a layer of fabric or a layer of cords.

In accordance with the objectives of the present invention, the configuration of sidewalls 60 of tire 10 provides runflat capability at zero inflation pressure while reducing the radial spring rate at normal inflation pressure thus providing superior ride characteristics. The construction and configuration of sidewalls 60 provide a significantly rounded sidewall with a rim interface having an angle between +30 degrees and −30 degrees with respect to the axis of rotation 20. Tire 10 may be mounted to a rim 12 having a narrower width 14 than a typical rim while remaining in the range of conventional rim widths. As such, the present invention allows a runflat tire to be provided as a replacement for a tire having an aspect ratio of 65 and larger. For instance, tires having aspect ratios of 65 and higher with 15 inch and larger rims are generally not a good candidate for conventional sidewall insert technology for providing runflat capabilities. A conventional runflat tire having an aspect ratio over 65 would have poor ride characteristics and a relatively high weight that would be undesirable for use with production vehicles. The present invention can be used in an application specifying an aspect ratio of over 65 with a rim larger than 38.1 cm.

The runflat capability of tire 10 is created by the radial stiffness of insert 70. The overall sidewall height of tire 10 is smaller than the sidewall height of a conventional tire thus causing the buckling strength of the column composed of the tire sidewall 60 and insert 70 to be much higher than could be achieved in a conventional tire using conventional insert technology. As such, the thickness of insert 70 for cantilever runflat tire 10 may be relatively thin compared to prior art inserts and not add a substantial amount of weight to tire 10. In addition, sidewall insert 70 only marginally increases the inflated vertical spring rate of cantilever runflat tire 10 in the inflated condition as compared to a prior art cantilever tire.

These factors combine to preserve the inflated ride characteristics of cantilever runflat tire 10 and avoid harsh ride characteristics associated with conventional sidewall insert runflat tires. For example, a standard spring rate for a conventional tire may be in the range of 1200 lb/in (2100 N/cm) to 1300 lb/in (2280 N/cm). A typical runflat will have about a 25% to 50% increased spring rate of around 1800 lb/in (3150 N/cm) to 1900 lb/in (3330 N/cm). The present invention provides a runflat tire having a spring rate of 1350 lb/in (2360 N/cm) to 1600 lb/in (2805 N/cm).

Tire 10 has the advantage that runflat technology may be extended to larger tire applications while not degrading the ride comfort. Cantilever runflat tire 10 additionally provides the benefit of better steering stability in the zero inflation condition because the rim is substantially less wide than the maximum width of tire 10. The rim width and the spacing between the beads helps maintain the beads inside tire 10 when running in the uninflated condition. Another advantage is that the larger rim diameter provides extra room for brakes. The structure of tire 10 may be applied to passenger car tires, light truck tires, racing tires, sport utility vehicle tires, ATV tires, and tires with and/or without tread patterns.

For the purpose of providing a comparative example, one sport utility vehicle tire known in the art has a section height of 18.3 cm with a rim width of 19.1 cm. The present invention provides a runflat tire that may be substituted for this type of tire wherein the runflat tire has a section height of 12.7 cm with a rim width of 12.7 cm. The section width of both tires is about 24.9 cm.

Figure 7:
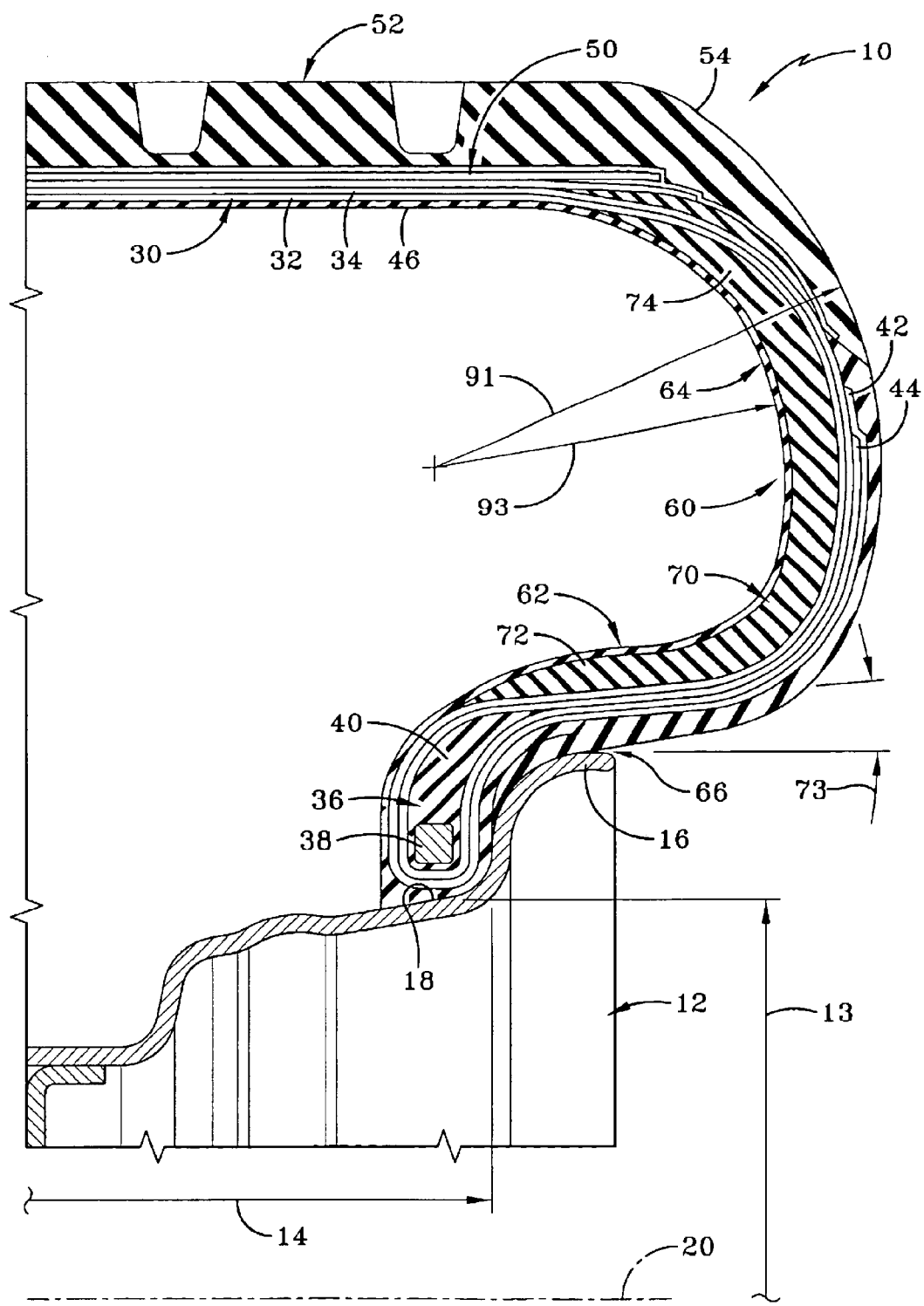
FIG. 7 is a view similar to FIG. 2 showing a different sidewall configuration.

FIG. 7 depicts an alternative embodiment of tire 10 having a different sidewall configuration. Tire 10 depicted in FIG. 7 includes a sidewall 60 having a rounded sidewall with an outer radius 91 and an inner radius 93. The size and shape of sidewall 60 may be varied to provide different ride and handling characteristics to tire 10.

Figure 3:
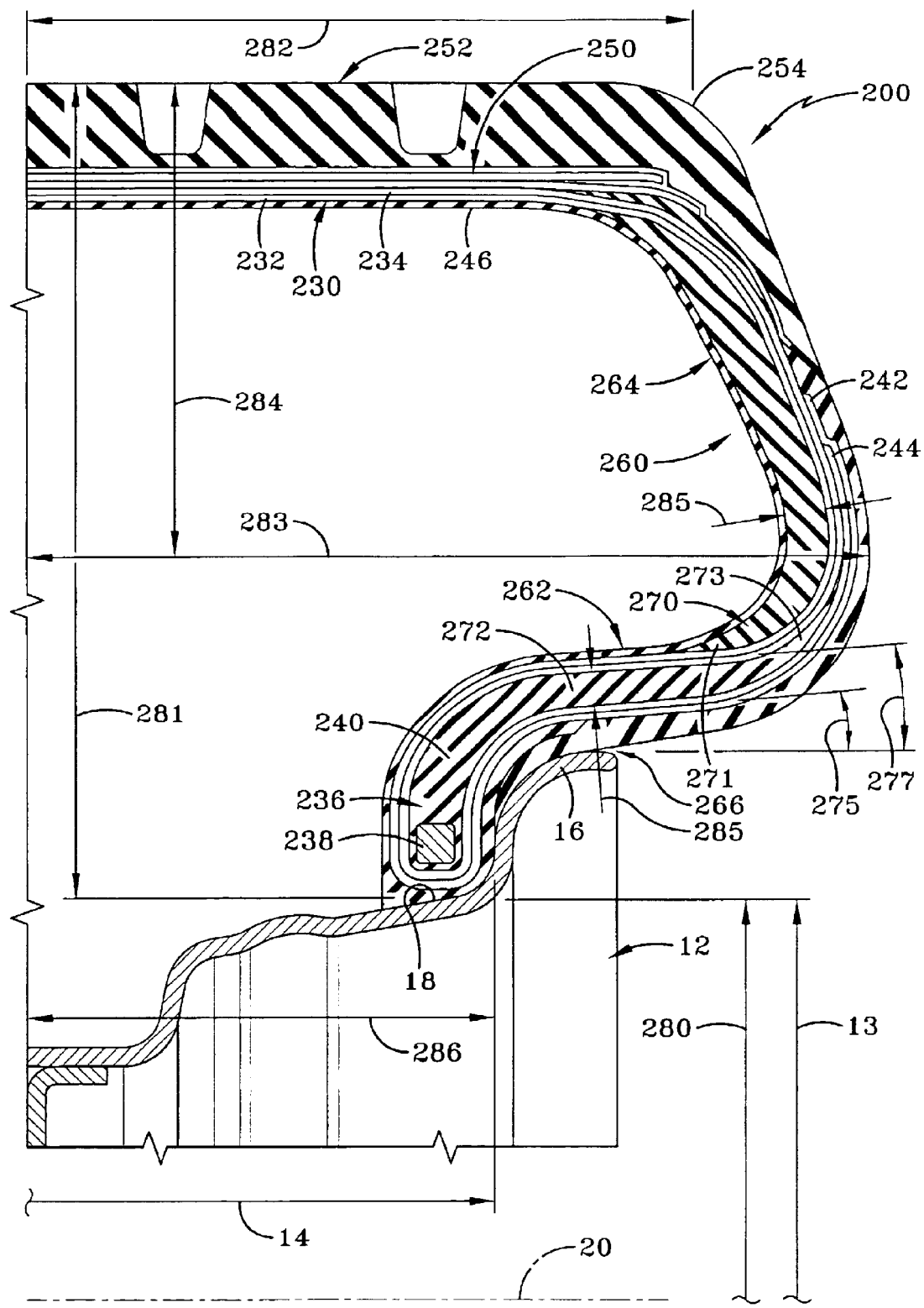
FIG. 3 is a view similar to FIG. 2 showing a second embodiment of the cantilever runflat tire of the present invention.

The second embodiment of the cantilever runflat tire of the present invention is indicated generally by the numeral 200 in FIG. 3. Tire 200 is mounted on rim 12 having the same elements described above with respect to the first embodiment of the invention. Tire 200 generally includes a tire carcass structure 230 that includes a first body ply 232 and a second body ply 234 extending generally between a pair of axially-spaced bead portions 236. Each bead portion 236 includes a bead core or bead ring 238 and a bead filler 240.

First and second body plies 232 and 234 are turned up around each bead portion 236 in the axially and radially outward direction and end at first body ply end 242 and second body ply end 244. Tire 200 also includes an innerliner 246.

Tire 200 may also include a belt package 250 disposed radially outward of plies 232 and 234 and radially inward of a tread portion 252. The structure of belt package 250 may vary with different types of tires 200 as is known in the art. Tread portion 252 includes a pair of tread edges 254.

Tire 200 further includes a pair of axially-spaced apart sidewalls 260. Each sidewall 260 extends from a bead portion 236 to a tread edge 254 of tread portion 252. Each sidewall 260 includes a cantilever portion 262 that is cantilevered with respect to axis of rotation 20. Each sidewall 260 further includes a radial portion 264 that extends between cantilever portion 262 and tread edge 254. Each cantilever portion 262 extends from the sidewall-rim junction 266 to the radially inward end of radial portion 264.

Each sidewall 260 further includes a sidewall insert 270. Insert 270 is preferably crescent shaped but may be provided in a variety of other shapes known in the art. Insert 270 is positioned between plies 232, 234 and innerliner 246 in the second embodiment of the invention. In the second embodiment of the present invention, sidewall insert 270 is mostly disposed in the radial direction with only a small axial portion 271 forming the axially outer end of a cantilevered portion 272. The radial outer end of insert 270 preferably overlaps belts 250 by at least 1.25 cm to 2.54 cm. In this embodiment, cantilevered portion 272 is mostly created by extending bead filler 240 axially outwardly to the radially inner end of insert 270 such that the axially outer end of bead filler 240 turns up in the radially outward direction as shown at numeral 273 and overlaps portion 271 of insert 270. Bead filler 240 thus spaces plies 232 and 234 in the cantilevered portion 272. As with the first embodiment, each portion 272 is disposed between +30 degrees and −30 degrees (angle 275 or 277) with respect to axis of rotation 20. Cantilevered portion 272 is preferably disposed substantially parallel to axis of rotation 20. Insert 270 and bead filler 240 are preferably fabricated from the same material and may be fabricated from the material described above with respect to the first embodiment of the invention.

In one exemplary embodiment, tire 200 has an inner diameter 280 of 46.1 cm and a section height 281 of 10.7 cm. Width 282 is 9.3 cm with width 283 being 11.4 cm. Distance 284 is 6.3 cm. Thickness 285 is 0.55 cm. Lastly, dimension 286 is 6.35 cm.

Figure 12:
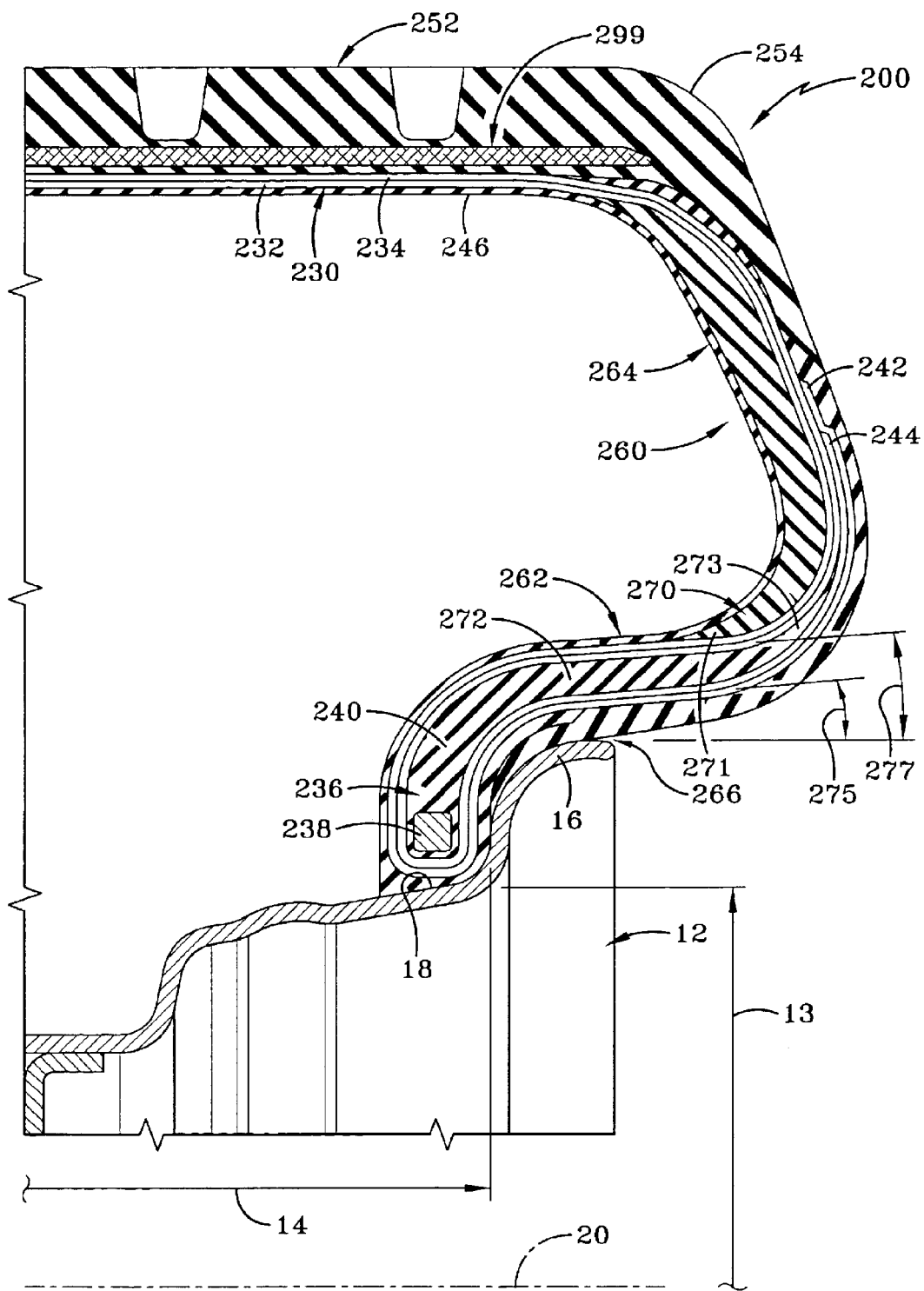
FIG. 12 is a view similar to FIG. 3 showing an alternate version of the tire depicted in FIG. 3.

An alternative version of tire 200 is depicted in FIG. 12. Tire 200 shown in FIG. 12 includes the same elements discussed above in addition to a circumferential band element 299 disposed in the crown portion of the tire beneath the tread. Band element 299 is a relatively thin, wide, high-strength, light-weight runflat element of the type known in the art. U.S. Pat. No. 5,879,484 discloses tire embodiments having band elements that may be used as band element 299. In other embodiments, other known elements 299 may be substituted.

Figure 4:
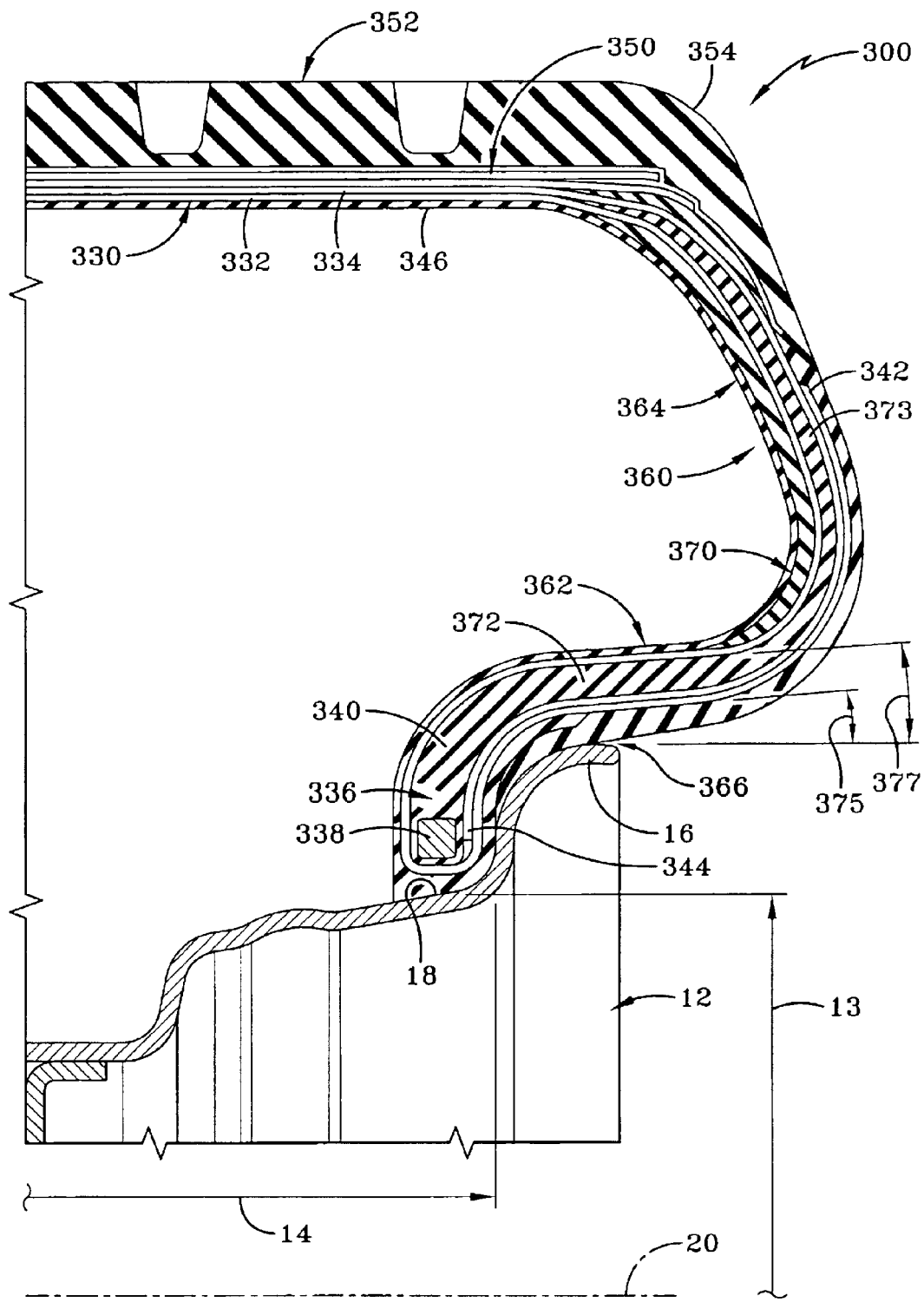
FIG. 4 is a view similar to FIG. 2 showing a third embodiment of the cantilever runflat tire of the present invention.

The third embodiment of the cantilever runflat tire of the present invention is indicated generally by the numeral 300 in FIG. 4. Tire 300 is mounted on rim 12 having the same elements described above with respect to the first embodiment of the invention. Tire 300 generally includes a tire carcass structure 330 that includes a first body ply 332 and a second body ply 334 extending generally between a pair of axially-spaced bead portions 336. Each bead portion 336 includes a bead core or bead ring 338 and a bead filler 340. First body ply 332 extends around the axially inner side of bead core 338, is turned up around bead portion 336 and the axially and radially outward direction, and ends at first body ply end 342. Second body ply 334 extends down to the axially outer side of bead core 338 and terminates at a second body ply end 344. Tire 300 also includes an innerliner 346.

Tire 300 may also include a belt package 350 disposed radially outward of plies 332 and 334 and radially inward of a tread portion 352. The structure of belt package 350 may vary with different types of tires 300 as is known in the art. Tread portion 352 includes a pair of tread edges 354.

Tire 300 further includes a pair of axially-spaced apart sidewalls 360. Each sidewall 360 extends from a bead portion 336 to a tread edge 354 of tread portion 352. Each sidewall 360 includes a cantilever portion 362 that is cantilevered with respect to bead core 338. Each sidewall 360 further includes a radial portion 364 that extends between cantilever portion 362 and tread edge 354. Each cantilever portion 362 extends axially outwardly from the sidewall-rim junction 366 to the radially inward end of radial portion 364.

Each sidewall 360 further includes a sidewall insert 370 that is preferably crescent shaped but may be provided in other shapes known in the art. Insert 370 is positioned between ply 332 and innerliner 346. Sidewall insert 370 extends from the radially outer end of sidewall 360 to the axially outer end of cantilever portion 362. In a third embodiment of the invention, bead filler 340 extends axially outwardly through cantilever portion 362, turns upwardly in the radially outward direction, and extends up to the radially outer end of sidewall 360. As such, bead filler 340 includes a cantilevered portion 372 and a radial sidewall portion 373. Cantilevered portion 372 is cantilevered at an angle 375 or 377 with respect to axis of rotation 20 of between +30 degrees and −30 degrees. Cantilevered portion 372 and radial portion 373 of bead filler 340 spaced body ply 332 from body ply 334 throughout sidewall 360. However, the turnup portion of body ply 332 lies against the axially outer surface of body ply 334. The radial outer ends of insert 370 and radial portion 373 preferably overlap belts 350. The materials of insert 370 and bead filler 340 are preferably as described above with respect to the first embodiment of the invention.

Figure 5:
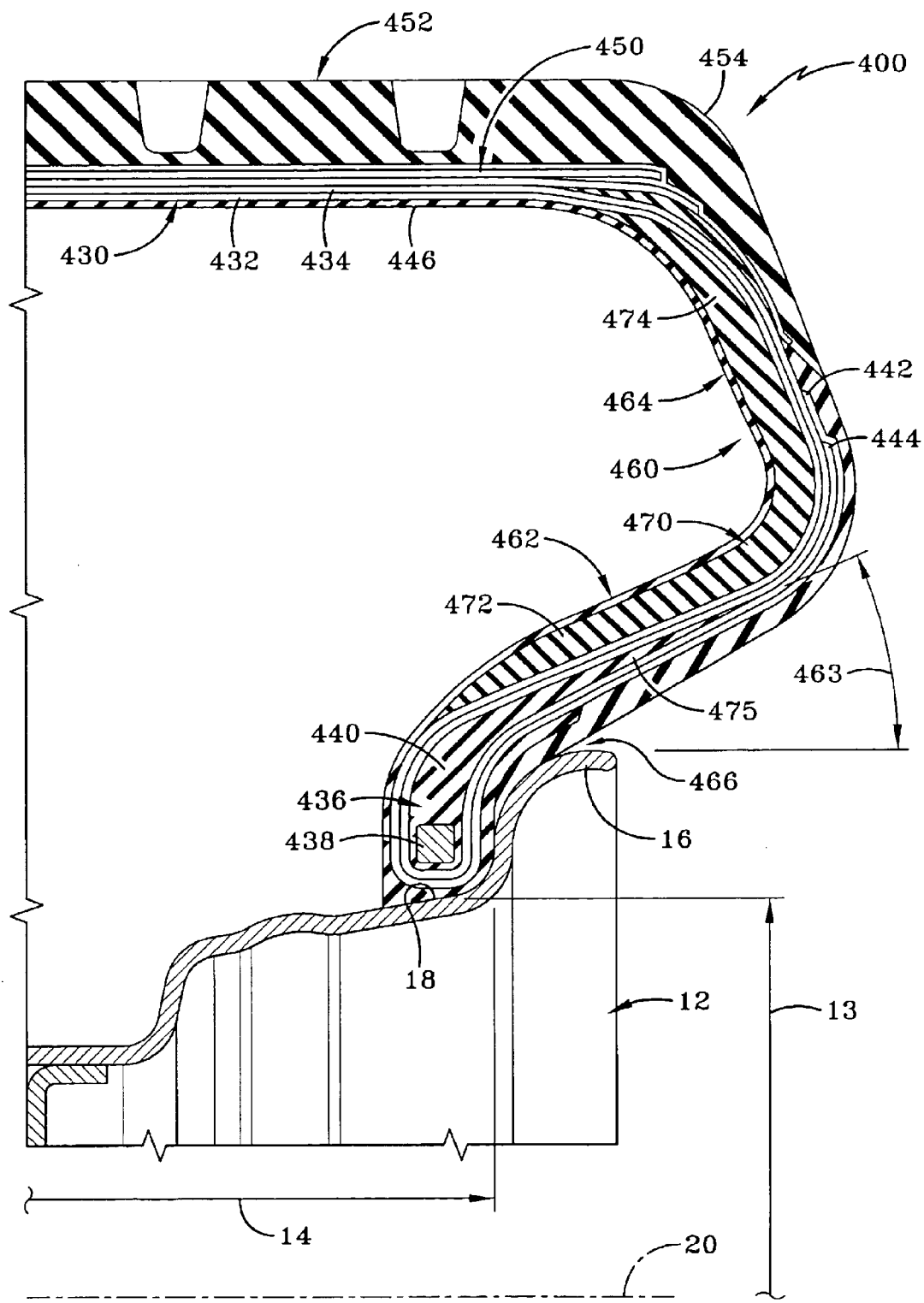
FIG. 5 is a view similar to FIG. 2 showing a fourth embodiment of the cantilever runflat tire of the present invention.

The fourth embodiment of the cantilever runflat tire of the present invention is indicated generally by the numeral 400 in FIG. 5. Tire 400 is mounted on rim 12. Tire 400 generally includes a tire carcass structure 430 that includes a first body ply 432 and a second body ply 434 extending generally between a pair of axially-spaced bead portions 436. Each bead portion 436 includes a bead core or bead ring 438 and a bead filler 440. First and second body plies 432 and 434 are turned up around each bead portion 436 in the axially and radially outward direction, and ends at first body ply end 442 and second body ply end 444. Tire 400 also includes an innerliner 446.

Tire 400 may also include a belt package 450 disposed radially outward of plies 432 and 434 and radially inward of tread portion 452. The structure of belt package 450 may vary with different types of tires 400 as is known in the art. Tread portion 452 includes a pair of tread edges 454.

Figure 6:
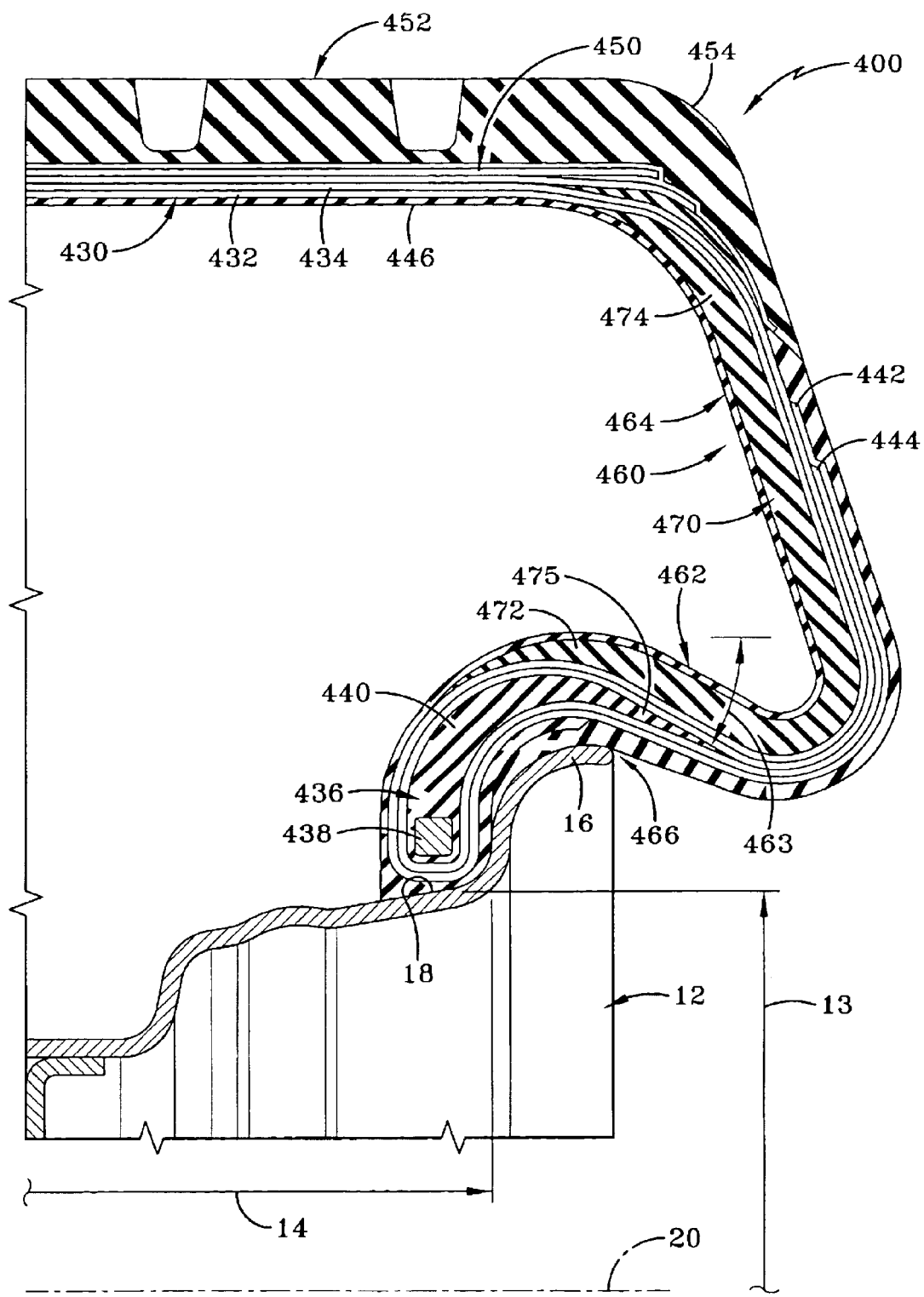
FIG. 6 is a sectional view of half of an alternate version of the fourth embodiment of the cantilever runflat tire with a cantilevered portion disposed at a negative angle with respect to the rotational axis of the tire.

Tire 400 further includes a pair of axially-spaced apart sidewalls 460. Each sidewall 460 extends from a bead portion 436 to a tread edge 454 of tread portion 452. Each sidewall 460 includes a cantilever portion 462 that is cantilevered with respect to bead core 438. In the fourth embodiment of the invention, cantilever portion 462 is depicted as being disposed at angle 463 that is about +30 degrees with respect to axis of rotation 20. The fourth embodiment of the invention thus depicts an embodiment where cantilever portion 462 is angled with respect to axis of rotation 20. In FIG. 6, cantilever portion 462 is disposed at an angle 463 of about −30 degrees with respect to axis of rotation 20. Each sidewall 460 further includes a radial portion 464 that extends between cantilever portion 462 and tread edge 454. Each cantilever portion 462 extends from the sidewall-rim junction 466 to the radially inward end of radial portion 464.

Each sidewall 460 further includes a sidewall insert 470 that is preferably crescent shaped. Insert 470 is positioned between plies 432, 434 and innerliner 446. Sidewall insert 470 includes a cantilevered portion 472 and a radial portion 474. The radial outer end of radial portion 474 preferably overlaps belts 450. In a fourth embodiment of the invention, bead filler 440 extends axially outwardly between plies 432, 434 and their respective turnup portions to include a cantilevered portion 475. Insert 470 and bead filler 440 are preferably fabricated from the same material and preferably fabricated from the material described above with respect to the first embodiment of the invention.

Figure 8:
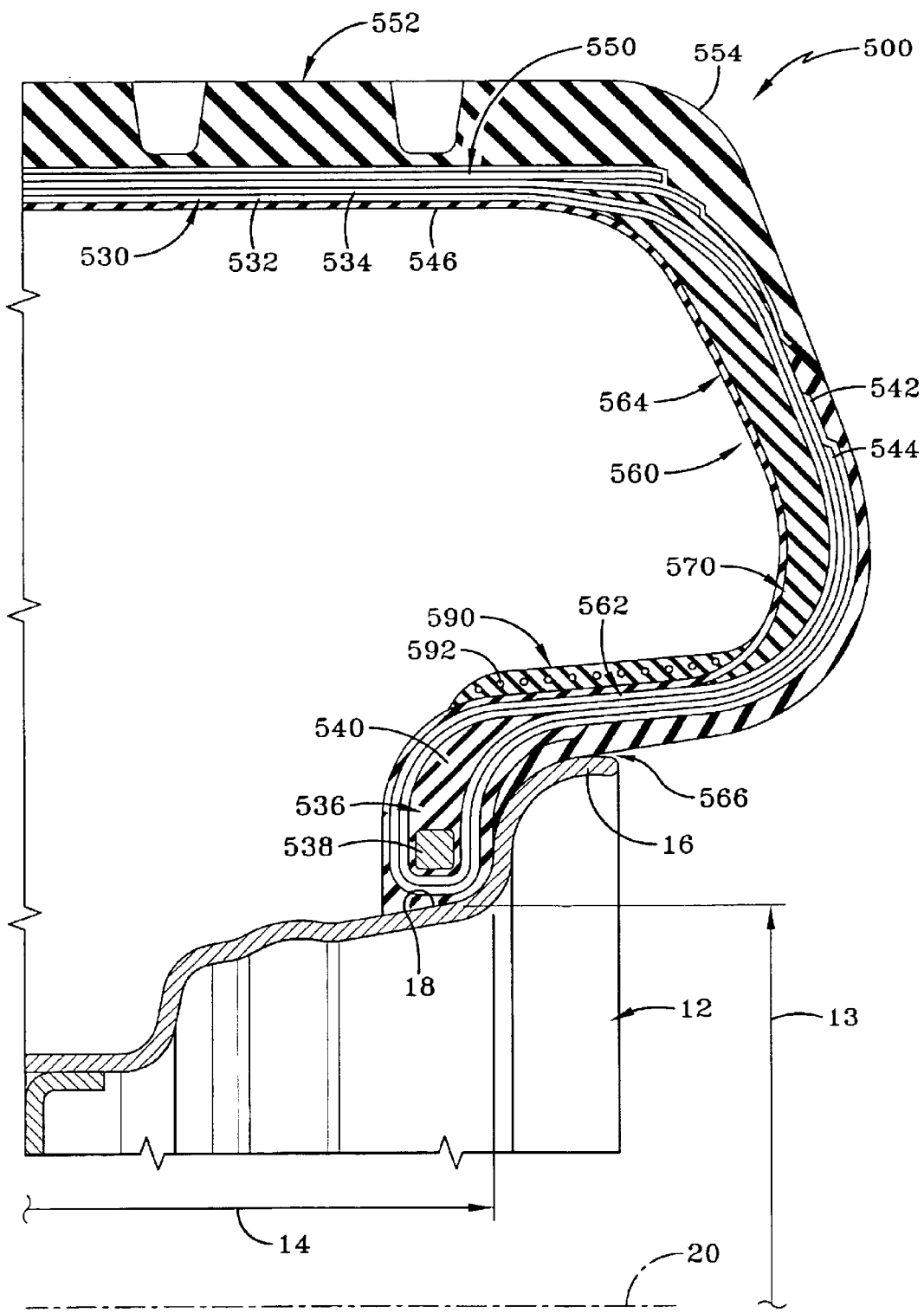
FIG. 8 is a view similar to FIG. 2 showing a fifth embodiment of the cantilever runflat tire of the present invention.

The fifth embodiment of the cantilever runflat tire of the present invention is indicated generally by the numeral 500 in FIG. 8. Tire 500 is mounted on rim 12. Tire 500 includes a tire carcass structure 530 that includes a first body ply 532 and a second body ply 534 extending generally between a pair of axially-spaced bead portions 536. Each bead portion 536 includes a bead core or bead ring 538 and a bead filler 540. First and second body plies 532 and 534 are turned up around each bead portion 536 in the axially and radially outward direction and end at first body ply end 542 and second body ply end 544. Tire 500 also includes an innerliner 546.

Tire 500 may also include a belt package 550 disposed radially outward of plies 532 and 534 and radially inward of a tread portion 552. The structure of belt package 550 may vary with different types of tires 500 as is known in the art. Tread portion 552 includes a pair of tread edges 554.

Tire 500 further includes a pair of axially spaced apart sidewalls 560. Each sidewall 560 extends from a bead portion 536 to a tread edge 554 of tread portion 552. Each sidewall 560 includes a cantilever portion 562 that is cantilevered with respect to bead core 538. Cantilever portion 562 is disposed +/−30 degrees with respect to axis of rotation 20. In the first embodiment, cantilever portion 562 extends substantially parallel to axis of rotation 20. Each sidewall 560 further includes a radial portion 564 that extends between cantilever portion 562 and tread edge 554. Each cantilever portion 562 extends from the sidewall-rim junction 566 to the radially inward end of radial portion 564.

Each sidewall 560 further includes a sidewall insert 570. Insert 570 is preferably crescent-shaped as depicted in the drawings but may be provided in a variety of other shapes as are known in the art. For instance, insert 570 may have a constant thickness, may be tapered evenly, or may be tapered unevenly along the length of its cross section. Insert 570 is positioned between plies 532, 534 and innerliner 546 in the fifth embodiment of the invention. The outer end of belt package 500 overlaps the radially outer end of insert 570 to provide durability. The overlap is preferably 1.25 cm to 2.54 cm.

In the fifth embodiment of the invention, tire 500 further includes a stiffener ring 590 disposed on the inner surface of tire 500 at cantilever portion 562 of sidewall 560. Stiffener ring 590 is applied in any of a variety of known manners. Stiffener ring 590 may be fabricated entirely from rubber or may include reinforcing cords or fabric 592. In the embodiment depicted in the drawings, ring 590 overlaps both insert 570 and bead filler 540.

Figure 9:
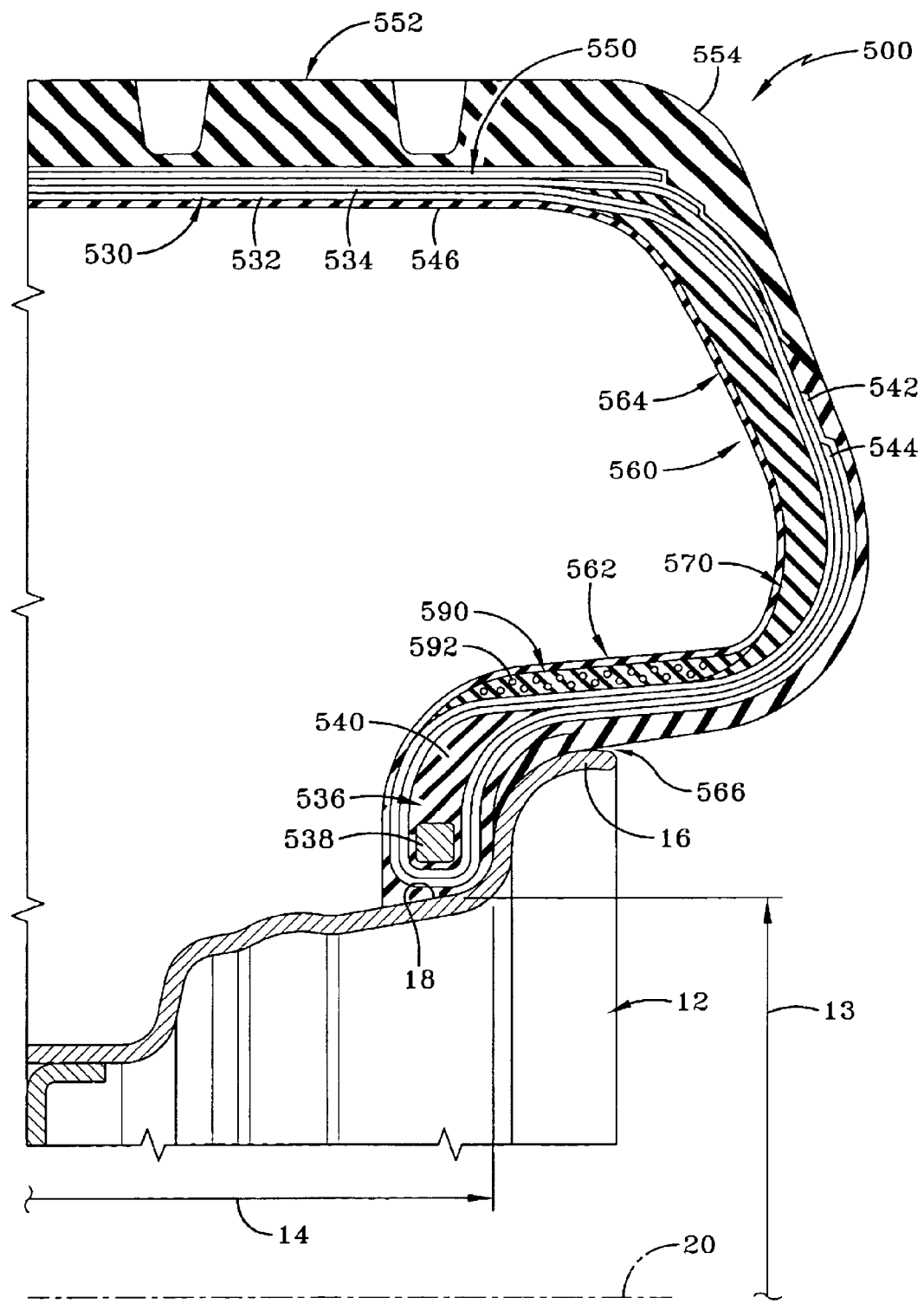
FIG. 9 is a view similar to FIG. 2 showing a sixth embodiment of the cantilever runflat tire of the present invention.
Figure 10:
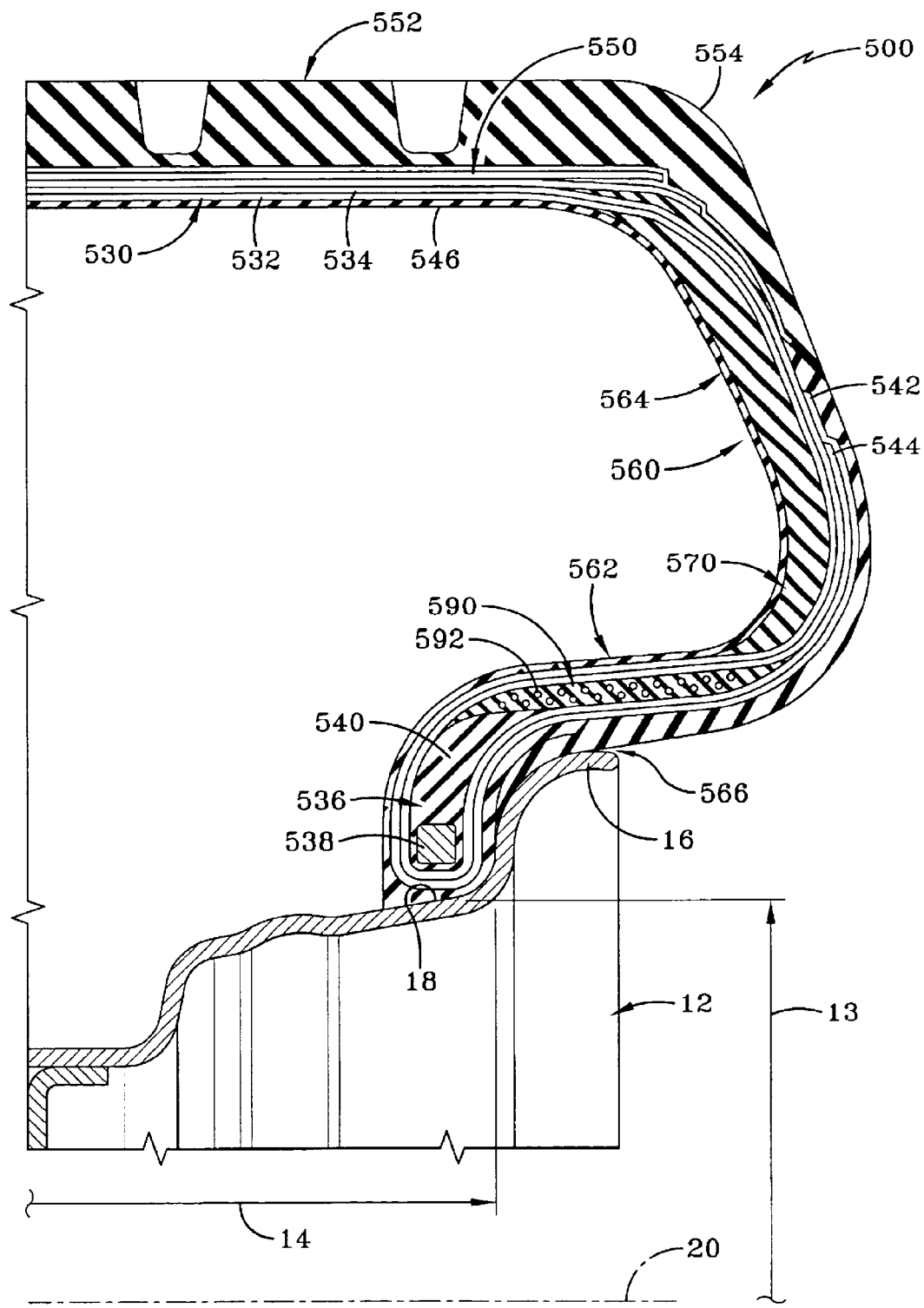
FIG. 10 is a view similar to FIG. 2 showing a seventh embodiment of the cantilever runflat tire of the present invention.
Figure 11:
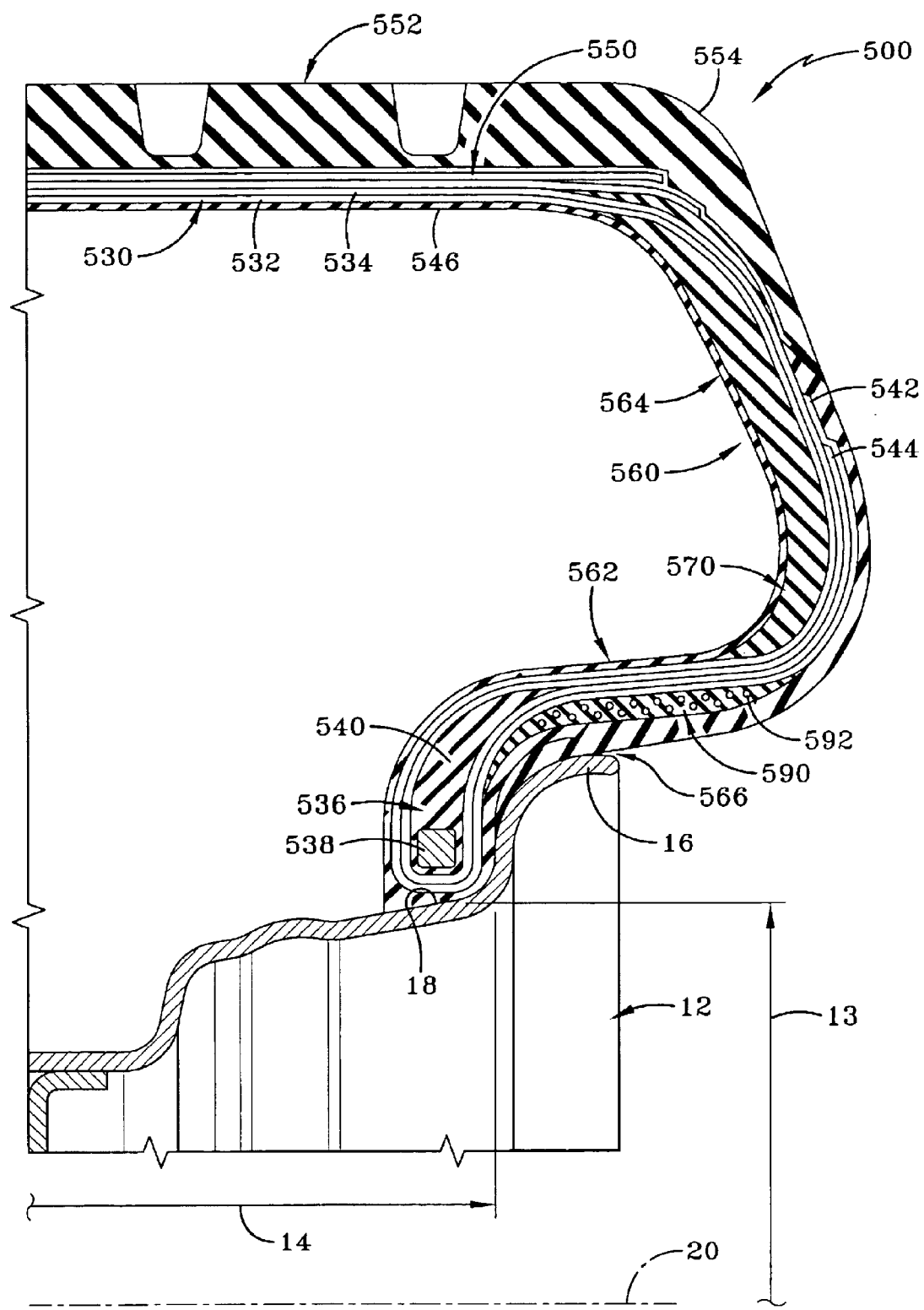
FIG. 11 is a view similar to FIG. 2 showing an eighth embodiment of the cantilever runflat tire of the present invention.

In the sixth embodiment of the invention shown in FIG. 9, ring 590 is disposed immediately inside body cords 532 and 534 at the cantilevered portion. Ring 590 may include multiple layers of cords 592. Tire 500 may include a single ring 590 or a pair of rings 590 in both positions shown in FIGS. 8 and 9. In the seventh embodiment, ring 590 is positioned between body cords 532 and 534. In the eighth embodiment, ring 590 is positioned outside body cords 532 and 534. In any of these embodiments, tire 500 may include a combination of rings 590 in any of these positions.

In the preferred embodiment of tire 500, bead filler 540 and sidewall insert 570 are fabricated from the same material. The preferred material is a hard, high modulus rubber compound. For example, a hard, high modulus rubber compound having a Shore A Durometer between 70–97, a mechanical static modulus in the range of 1400 psi (9651 KPa) to 4000 psi (27576 KPa) (Young's Modulus) at 15% strain, and a loss tangent delta (tan δ) between 0.03 to 0.20 measured at 100° C., 7% deflection, and 10 Hz. Other similar materials may be used by those skilled in the art to fabricate tire 500. Insert 570 may also include reinforcing members such as a layer of fabric or a layer of cords.

In each of the embodiments described above, the tire structure provides runflat capabilities while having desirable ride characteristics. The embodiments are exemplary and modifications to the structures may be made without departing from the concepts of the present invention. For instance, in each of the embodiments described above, a pair of body plies are used in the tire carcass. In other embodiments, the invention may use a single body ply instead of the pair of body plies depicted in each of the drawings. In addition, the materials may be changed to other known materials without departing from the concepts of the present invention. The specific arrangement of turnup ends, belt packages, and treads may also vary as is known in the art. For instance, the thickness of the inserts, shape of the inserts, and radius of the sidewalls may be varied to alter the ride and handling characteristics of the tire as is known in the art. In each of the embodiments, the beads will not escape from the rim in the uninflated condition.

Accordingly, the improved cantilever runflat tire apparatus is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness, and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the cantilever runflat tire is constructed and used, the characteristics of the construction, and the advantageous new and useful results obtained; the new and useful structures, devices, elements, arrangements, parts, and combinations are set forth in the appended claims.

What is claimed is:

1. A runflat tire having an axis of rotation, the tire comprising:
    a pair of axially-spaced bead portions; each bead portion having a bead core;
    a pair of axially-spaced sidewalls;
    at least one body ply;
    each of the sidewalls including a sidewall insert disposed axially inwardly of the at least one body ply; the sidewall inserts being adapted to support the sidewall in an uncollapsed runflat operating condition; the sidewall inserts being fabricated from a high modulus material; and
    each of the sidewalls having a radial portion and a cantilever portion, the cantilever portion being cantilevered with respect to the bead core; the cantilever portion of the sidewall being configured such that a reference line tangent to the at least one body ply in the cantilever portion of the sidewall is disposed at an angle in the range of +30 degrees to −30 degrees with respect to the axis of rotation of the tire.

2. The tire of claim 1, wherein the cantilever portion includes a portion of the sidewall insert.

3. The tire of claim 2, wherein the sidewall insert includes a cantilevered portion disposed in the cantilever portion of the sidewall.

4. The tire of claim 3, wherein the sidewall insert includes an axially inner end disposed adjacent the radially outer end of the bead portion.

5. The tire of claim 4, wherein the sidewall insert is crescent shaped.

6. The tire of claim 1, wherein each bead portion includes a bead filler that extends into the cantilever portion of the sidewall.

7. A runflat tire having an axis of rotation, the tire comprising:
    a pair of axially-spaced bead portions; each bead portion having a bead core;
    a pair of axially-spaced sidewalls;
    at least one body ply;
    each of the sidewalls including a sidewall insert disposed axially inwardly of the at least one body ply; the sidewall inserts being adapted to support the sidewall in an uncollapsed runflat operating condition; the sidewall inserts being fabricated from a high modulus material;
    each of the sidewalls having a radial portion and a cantilever portion, the cantilever portion being cantilevered with respect to the bead core; the cantilever portion of the sidewall being configured such that a reference line tangent to the at least one body ply in the cantilever portion of the sidewall is disposed at an angle in the range of +30 degrees to −30 degrees with respect to the axis of rotation of the tire; and
    the bead portion including an axially-disposed outer end disposed adjacent the radially-disposed inner end of the sidewall insert.

8. The tire of claim 7, wherein each of the sidewall inserts are crescent shaped.

9. A runflat tire having an axis of rotation, the tire comprising:
    a pair of axially-spaced bead portions; each bead portion having a bead core;
    a pair of axially-spaced sidewalls;
    a first body ply and a second body ply;
    each of the sidewalls including a sidewall insert adapted to support the sidewall in a runflat operating condition; the sidewall inserts being fabricated from a high modulus material;
    each of the sidewalls having a radial portion and a cantilever portion, the cantilever portion being cantilevered with respect to the bead core; the cantilever portion of the sidewall being configured such that a reference line tangent to the at least one body ply in the cantilever portion of the sidewall is disposed at an angle in the range of +30 degrees to −30 degrees with respect to the axis of rotation of the tire; and
    each bead portion extending through the cantilever portion of the sidewall and including a radially-disposed outer end disposed adjacent the radially-disposed outer end of the sidewall insert.

10. The tire of claim 9, wherein the bead portion is disposed between the first and second body plies.

11. The tire of claim 10, wherein the bead portion includes a bead core and a bead filler; the first body ply is turned up around the bead core and the second body ply has an end disposed adjacent the bead core.

12. The tire of claim 11, wherein the turned up portion of the first body ply is disposed axially outward of the second body ply.

13. The tire of claim 12, wherein the sidewall insert is crescent shaped.

14. A runflat tire having an axis of rotation, the tire comprising:
    a pair of axially-spaced bead portions; each bead portion having a bead core;
    a pair of axially-spaced sidewalls;
    a first body ply and a second body ply;
    each of the sidewalls including a sidewall insert adapted to support the sidewall in an uncollapsed runflat operating condition; the sidewall inserts being fabricated from a high modulus material;

each of the sidewalls having a radial portion and a cantilever portion, the cantilever portion being cantilevered with respect to the bead core; the cantilever portion of the sidewall being configured such that a reference line tangent to the at least one body ply in the cantilever portion of the sidewall is disposed at an angle in the range of +30 degrees to −30 degrees with respect to the axis of rotation of the tire; and the bead portion including a bead filler; and the bead filler being disposed between the first and second body plies in the cantilever portion of the sidewall.

15. The tire of claim 6, wherein the cantilever portion of the sidewall also includes a cantilevered portion of the sidewall insert.

16. The tire of claim 15, wherein the bead portion includes a bead core and a bead filler; the tire further comprising first and second body plies; the bead filler being disposed between the first and second body plies in the cantilever portion of the sidewall.

17. The tire of claim 16, wherein the sidewall insert is crescent shaped.

18. The tire of claim 1, wherein the bead portion includes a bead filler; the bead filler and the sidewall insert being fabricated from the same material.

19. The tire of claim 18, wherein the material of the insert and the bead filler are fabricated from a hard, high modulus rubber compound having a Shore A Durometer between 70 and 97, a mechanical static modulus in the range of 1400 psi to 4000 psi at 15% strain, and loss tangent delta (tan δ) between 0.03 to 0.2 measured at 100° C., 7% deflection, and 10 Hz.

20. The tire of claim 1, further comprising a stiffener ring connected to each of the sidewalls at the cantilever portion.

21. The tire of claim 20, wherein each of the sidewalls has an inner surface; the stiffener ring connected to the inner surface.

22. The tire of claim 20, wherein the stiffener ring is embedded within the sidewalls.

23. The tire of claim 22, wherein a belt package is at least partially disposes within the sidewalls.

24. The tire of claim 20, wherein the stiffener ring is disposed axially-inside the body ply.

25. The tire of claim 20, wherein the stiffener ring is disposed axially-outside the body ply.

26. The tire of claim 20, wherein the body ply includes a main portion and a turned up portion; the stiffener ring being disposed between the main portion and the turned up portion of the body ply.

27. The tire of claim 1, wherein the tire includes a crown portion and a runflat band element disposed in the crown portion of the tire.

28. A runflat tire having an axis of rotation, the tire comprising:

a pair of axially-spaced bead portions; each bead portion having a bead core;

a pair of axially-spaced sidewalls;

at least one body ply;

each of the sidewalls including a sidewall insert; the sidewall inserts being adapted to support the sidewall in an uncollapsed runflat operating condition; the sidewall inserts being fabricated from a high modulus material;

each of the sidewalls having a radial portion and a cantilever portion, the cantilever portion being cantilevered with respect to the bead core; the cantilever portion of the sidewall being configured such that a reference line tangent to the at least one body ply in the cantilever portion of the sidewall is disposed at an angle in the range of +30 degrees to −30 degrees with respect to the axis of rotation of the tire;

each bead portion including a bead filler that extends into the cantilever portion of the sidewall; and the bead filler including an axially-disposed outer end that overlaps the position of at least a portion of the sidewall insert.

29. The tire of claim 28, wherein the sidewall insert is disposed axially inwardly of the body ply.

30. The tire of claim 28, wherein the bead filler and the sidewall insert are fabricated from the same material.

31. The tire of claim 30, wherein the material of the insert and the bead filler are fabricated from a hard, high modulus rubber compound having a Shore A Durometer between 70 and 97, a mechanical static modulus in the range of 1400 psi to 4000 psi at 15% strain, and loss tangent delta (tan δ) between 0.03 to 0.2 measured at 100° C., 7% deflection, and 10 Hz.

32. The tire of claim 28, wherein the bead filler extends through the cantilever portion of the sidewall.

33. The tire of claim 11, wherein the bead portion includes a bead filler; the bead filler and the sidewall insert being fabricated from the same material.

34. The tire of claim 33, wherein the material of the insert and the bead filler are fabricated from a hard, high modulus rubber compound having a Shore A Durometer between 70 and 97, a mechanical static modulus in the range of 1400 psi to 4000 psi at 15% strain, and loss tangent delta (tan δ) between 0.03 to 0.2 measured at 100° C., 7% deflection, and 10 Hz.

35. The tire of claim 1, wherein the cantilever portion of the sidewall is configured such that a reference line tangent to the at least one body ply in the cantilever portion of the sidewall is disposed at an angle in the range of +15 degrees to −15 degrees with respect to the axis of rotation of the tire.

36. The tire of claim 35, wherein the cantilever portion of the sidewall is configured such that a reference line tangent to the at least one body ply in the cantilever portion of the sidewall is disposed at an angle in the range of +5 degrees to −5 degrees with respect to the axis of rotation of the tire.

* * * * *